US010150571B2

(12) United States Patent
Cordatos et al.

(10) Patent No.: US 10,150,571 B2
(45) Date of Patent: Dec. 11, 2018

(54) ON-BOARD AIRCRAFT REACTIVE INERTING DRIED GAS SYSTEM

(71) Applicant: HAMILTON SUNDSTRAND CORPORATION, Windsor Locks, CT (US)

(72) Inventors: Haralambos Cordatos, Colchester, CT (US); Jonathan Rheaume, West Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 23 days.

(21) Appl. No.: 15/348,287

(22) Filed: Nov. 10, 2016

(65) Prior Publication Data

US 2018/0127110 A1 May 10, 2018

(51) Int. Cl.
| | |
|---|---|
| B01D 53/22 | (2006.01) |
| B64D 37/32 | (2006.01) |
| B01D 5/00 | (2006.01) |
| B01D 53/26 | (2006.01) |
| A62C 3/08 | (2006.01) |

(52) U.S. Cl.
CPC .............. B64D 37/32 (2013.01); A62C 3/08 (2013.01); B01D 5/0003 (2013.01); B01D 5/0075 (2013.01); B01D 53/265 (2013.01); B01D 53/266 (2013.01); B01D 53/268 (2013.01); B01D 2258/01 (2013.01); B01D 2259/4575 (2013.01)

(58) Field of Classification Search
CPC .. B01D 53/265; B01D 5/0075; B01D 5/0003; B01D 53/22; B01D 53/266; B01D 53/268; B64D 37/32
See application file for complete search history.

(56) References Cited

U.S. PATENT DOCUMENTS

| 2,845,383 A | 7/1958 | Bowles, Jr. et al. |
| 3,590,559 A | 7/1971 | Bragg et al. |
| 3,672,180 A | 6/1972 | Davis |

(Continued)

FOREIGN PATENT DOCUMENTS

| DE | 4225170 A1 | 2/1994 |
| DE | 102009040013 A1 | 3/2011 |

(Continued)

OTHER PUBLICATIONS

Woodford et al "Heat exchangers", pp. 1-7; Jan. 17, 2016; https://web.archive.org/web/20161030205435/http://www.explainthatstuff.com/how-heat-exchangers-work.html.*

(Continued)

*Primary Examiner* — Anthony R Shumate
(74) *Attorney, Agent, or Firm* — Cantor Colburn LLP (57) ABSTRACT

An on-board aircraft inert gas system includes a source of hydrocarbon, a source of gas comprising oxygen, and a first fluid flow path between the source of gas comprising oxygen and an inert gas output. A reactor is disposed along the first fluid flow path that reacts oxygen and hydrocarbon from the fuel tank gas space to produce an oxygen-depleted gas. A heat exchanger condenser removes some water from the oxygen-depleted gas. A water-permeable gas membrane separator receives the oxygen-depleted gas from the heat exchanger and outputs dried oxygen-depleted gas.

20 Claims, 4 Drawing Sheets

(56) References Cited

U.S. PATENT DOCUMENTS

| | | |
|---|---|---|
| 3,710,549 A | 1/1973 | Nichols et al. |
| 3,732,668 A | 5/1973 | Nichols |
| 3,788,039 A | 1/1974 | Bragg |
| 3,847,298 A | 11/1974 | Hamilton |
| 4,681,602 A | 7/1987 | Glenn et al. |
| 5,220,799 A | 6/1993 | Lievens et al. |
| 5,255,735 A | 10/1993 | Raghava et al. |
| 5,782,188 A | 7/1998 | Evans et al. |
| 5,843,212 A | 12/1998 | Nanaji |
| 6,012,533 A | 1/2000 | Cramer |
| 6,315,815 B1 | 11/2001 | Spadaccini et al. |
| 6,432,169 B1 | 8/2002 | Kluwe et al. |
| 6,440,317 B1 | 8/2002 | Koethe |
| 6,578,639 B1 | 6/2003 | Osime et al. |
| 6,705,092 B1* | 3/2004 | Zhou ............ B01D 53/22 62/401 |
| 6,729,359 B2* | 5/2004 | Jones ............ B64D 13/08 141/1 |
| 6,840,292 B2 | 1/2005 | Hart et al. |
| 7,204,868 B2 | 4/2007 | Snow, Jr. |
| 7,459,081 B2 | 12/2008 | Koenig et al. |
| 7,517,388 B2 | 4/2009 | Jensvold |
| 7,595,019 B2 | 9/2009 | Cutler et al. |
| 7,628,965 B2 | 12/2009 | Johnson |
| 7,694,916 B2 | 4/2010 | Limaye |
| 7,896,292 B2 | 3/2011 | Limaye |
| 7,905,259 B2 | 3/2011 | Johnson |
| 8,192,532 B1 | 6/2012 | Gupta |
| 8,245,978 B1 | 8/2012 | Beers et al. |
| 8,388,740 B2 | 3/2013 | Sohn et al. |
| 8,499,567 B2 | 8/2013 | Hagh |
| 8,602,362 B2 | 12/2013 | Buchwald |
| 8,763,712 B2 | 7/2014 | Kotliar |
| 8,801,831 B1 | 8/2014 | Snow, Jr. et al. |
| 8,813,860 B2 | 8/2014 | Bleil et al. |
| 8,882,886 B2 | 11/2014 | Evosevich et al. |
| 8,904,669 B2 | 12/2014 | Tichborne et al. |
| 8,925,865 B2 | 1/2015 | Stolte et al. |
| 8,950,703 B2 | 2/2015 | Bayliss et al. |
| 9,016,078 B2 | 4/2015 | Gupta |
| 9,096,326 B2 | 8/2015 | Dooley et al. |
| 9,114,886 B2 | 8/2015 | Gupta |
| 9,118,054 B2 | 8/2015 | Gummalla et al. |
| 9,120,571 B2 | 9/2015 | Kshirsagar et al. |
| 9,174,740 B2 | 11/2015 | Stolte et al. |
| 9,186,622 B1 | 11/2015 | Ranjan et al. |
| 9,216,931 B1 | 12/2015 | Su |
| 9,340,297 B2 | 5/2016 | Cao |
| 9,511,874 B2 | 12/2016 | Tiger |
| 9,687,773 B2 | 6/2017 | Johnson et al. |
| 2002/0152889 A1 | 10/2002 | Baker et al. |
| 2002/0160240 A1 | 10/2002 | Matsui et al. |
| 2003/0196645 A1 | 10/2003 | Kojima et al. |
| 2004/0226438 A1 | 11/2004 | Jones |
| 2005/0048334 A1 | 3/2005 | Sridhar et al. |
| 2005/0247197 A1* | 11/2005 | Snow, Jr. ............ A62C 3/06 95/138 |
| 2006/0011063 A1 | 1/2006 | Zhou |
| 2006/0113248 A1 | 6/2006 | Koenig et al. |
| 2007/0039464 A1* | 2/2007 | Vanderhoof ......... B01D 53/268 95/45 |
| 2008/0128048 A1 | 6/2008 | Johnson et al. |
| 2008/0176174 A1* | 7/2008 | White ............ B01D 53/002 431/5 |
| 2009/0227195 A1 | 9/2009 | Buelow et al. |
| 2009/0321090 A1 | 12/2009 | Bleil et al. |
| 2009/0325014 A1 | 12/2009 | Newkirk |
| 2010/0006048 A1 | 1/2010 | Minty et al. |
| 2010/0107877 A1 | 5/2010 | Suzuki et al. |
| 2010/0155315 A1 | 6/2010 | Partridge et al. |
| 2010/0252005 A1 | 10/2010 | Kitamoto et al. |
| 2011/0003224 A1 | 1/2011 | Scheibert |
| 2011/0262309 A1 | 10/2011 | Limaye |
| 2012/0035406 A1 | 2/2012 | Lam et al. |
| 2012/0292058 A1 | 11/2012 | Bleil et al. |
| 2012/0325811 A1 | 12/2012 | Hagh et al. |
| 2013/0071594 A1 | 3/2013 | Bikson et al. |
| 2013/0098314 A1* | 4/2013 | Imran ............ F02B 43/12 123/3 |
| 2013/0168111 A1 | 7/2013 | Wong et al. |
| 2013/0214464 A1 | 8/2013 | Lancho Doncel |
| 2013/0312743 A1 | 11/2013 | Kshirsagar et al. |
| 2014/0150649 A1 | 6/2014 | Stolte et al. |
| 2014/0208943 A1 | 7/2014 | Gupta |
| 2014/0251426 A1 | 9/2014 | Bando et al. |
| 2014/0252171 A1 | 9/2014 | Dooley et al. |
| 2015/0000523 A1 | 1/2015 | Jojic et al. |
| 2015/0132214 A1 | 5/2015 | Eickhoff |
| 2015/0217153 A1 | 8/2015 | Jones |
| 2015/0344146 A1 | 12/2015 | Theodore et al. |
| 2015/0349356 A1 | 12/2015 | Ribarov et al. |
| 2015/0353201 A1 | 12/2015 | Hagh et al. |
| 2016/0030781 A1 | 2/2016 | Hoffjann et al. |
| 2016/0052639 A1 | 2/2016 | Burnell et al. |
| 2016/0064751 A1 | 3/2016 | Hoffjann et al. |
| 2016/0102261 A1 | 4/2016 | Lam et al. |
| 2016/0102032 A1 | 5/2016 | Du et al. |
| 2016/0167802 A1 | 6/2016 | Lo et al. |
| 2016/0176535 A1 | 6/2016 | Family et al. |
| 2016/0257419 A1 | 9/2016 | Artaud et al. |
| 2016/0361684 A1* | 12/2016 | Ranjan ............ B01D 53/22 |
| 2017/0122275 A1 | 5/2017 | Ishimitsu et al. |
| 2017/0145969 A1 | 5/2017 | Ishimitsu et al. |
| 2017/0167036 A1 | 6/2017 | Tew et al. |
| 2017/0331131 A1 | 11/2017 | Rheaume |
| 2017/0341019 A1 | 11/2017 | Rheaume |
| 2017/0368496 A1 | 12/2017 | Rheaume et al. |
| 2018/0016025 A1 | 1/2018 | Rheaume et al. |
| 2018/0118367 A1 | 5/2018 | Rheaume |

FOREIGN PATENT DOCUMENTS

| | | |
|---|---|---|
| DE | 102013100803 A1 | 7/2014 |
| EP | 3023518 A1 | 5/2016 |
| EP | 3260373 A1 | 12/2017 |
| GB | 1395691 | 5/1975 |
| WO | 9635634 | 11/1996 |
| WO | 2011117610 A1 | 9/2011 |

OTHER PUBLICATIONS

Perry et al "Perrys-Chemical-Engineers-handbook" McGraw-Hill, 7th Ed. 1999. p. 22-64.*

EP Communication; EP Extended Search Report Application No. 17170089.1-1659; dated Oct. 12, 2017, pp. 1-8.

H. Cordatos, "Air Separation System for Fuel Stabilization," U.S. Appl. No. 15/338,578, filed Oct. 31, 2016.

Search Report regarding related EP Application No. 17177967.1; dated Nov. 23, 2017; 8 pgs.

Search Report regarding related EP Application No. 17170089.1; dated Oct. 12, 2017; 8 pgs.

EP search Report; Application No. 17200886, dated Mar. 14, 2018, 2 pages.

W. Balster, et al., "Effects of Temerature on Formation of Insolubles in Aviation Fuels," The American Society of Mechanical Engineers, Presented a tthe Internationa Gas Turbine and Aeroengine Congress & Exhibition, Orlando, FL—Jun. 2-Jun. 5, 1997, pp. 1-6.

* cited by examiner

ON-BOARD AIRCRAFT REACTIVE INERTING DRIED GAS SYSTEM

BACKGROUND

This disclosure relates to aircraft and aircraft systems, and in particular to an on-board aircraft dried inert gas generation system.

It is recognized that fuel vapors within fuel tanks become combustible in the presence of oxygen. An inerting system decreases the probability of combustion of flammable materials stored in a fuel tank by maintaining a chemically non-reactive or inert gas, such as oxygen-depleted air, in the fuel tank vapor space also known as ullage. As used herein, the term "inert" means non-combustible. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as oxygen-depleted air (ODA) to the ullage, thereby displacing oxygen with a mixture of nitrogen and oxygen at target thresholds for avoiding explosion or combustion.

It is known in the art to equip aircraft with onboard inert gas systems, which supply oxygen-depleted air to the vapor space (i.e., ullage) within the fuel tank. The oxygen-depleted air has a substantially reduced oxygen content that reduces or eliminates combustible conditions within the fuel tank. Onboard inert gas systems typically use membrane-based gas separators. Such separators contain a membrane that is permeable to oxygen molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and ODA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions such as during aircraft descent can lead to an increased demand for ODA at precisely the time when engines could be throttled back for fuel savings so that that maintaining sufficient compressed air pressure for meeting the pneumatic demands may come at a significant fuel burn cost. Additionally, there is a trend to reduce or eliminate bleed-air systems in aircraft; for example Boeing's 787 has a no-bleed systems architecture, which utilizes electrical systems to replace most of the pneumatic systems in order to improve fuel efficiency, as well as reduce weight and lifecycle costs. Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided in the past to conventional onboard environmental control systems. A separate compressor or compressors can be used to provide pressurized air to the membrane gas separator, but this undesirably increases aircraft payload, and also represents another onboard device with moving parts that is subject to maintenance issues or device failure.

Alternate technologies have been proposed for aircraft fuel tank inerting, including the use of electrochemical cells or catalytic reactors to produce inerting gas. However, neither of these technologies has yet achieved commercial success, and new approaches for aircraft fuel tank inerting continue to be pursued.

BRIEF DESCRIPTION

According to some embodiments of this disclosure, an on-board aircraft inert gas system comprises a source of hydrocarbon, a source of a gas comprising oxygen, and a first fluid flow path between a gas space in the fuel tank and an inert gas output. A reactor is disposed along the first fluid flow path. The reactor comprises an inlet that receives hydrocarbon and the gas comprising oxygen and reacts the hydrocarbon with the oxygen to produce an oxygen-depleted gas comprising water vapor, and an outlet that outputs the oxygen-depleted gas comprising water vapor. A first heat exchanger comprises a water-condensing heat rejection side that is disposed along the first fluid flow path. The heat rejection side comprises an inlet that receives the oxygen-depleted gas from the reactor and an outlet that outputs oxygen-depleted gas with a reduced water content. A heat absorption side of the first heat exchanger is in thermal communication with a heat sink. A liquid separator, which can be integrated with or separate from the first heat exchanger, separates water condensate produced by the heat rejection side of the first heat exchanger from the oxygen-depleted gas with reduced water content. A gas separator comprising a membrane permeable to water comprises a first side of the membrane disposed along the first fluid flow path. The separator includes an inlet disposed on the first side of the membrane that receives the oxygen-depleted gas with reduced water content from the first heat exchanger and an outlet that outputs dried oxygen-depleted gas. Water is transported through the membrane to a second side of the membrane, where the separator comprises an outlet that outputs a fluid comprising water.

In some embodiments of the disclosure, a method of generating an inert gas comprises reacting hydrocarbon and oxygen in a gas comprising oxygen to produce an oxygen-depleted gas comprising water vapor. Heat is removed from the oxygen-depleted gas comprising water vapor to condense water vapor in a first heat exchanger, and removing condensate to produce an oxygen-depleted gas having reduced water content. The oxygen-depleted gas having reduced water content is contacted with a membrane permeable to water to produce dried oxygen-depleted gas.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

As mentioned above, this disclosure relates to on-board aircraft inert gas system. As used herein, the term "aircraft" includes any powered conveyance device capable of sustaining flight.

Figure 1:
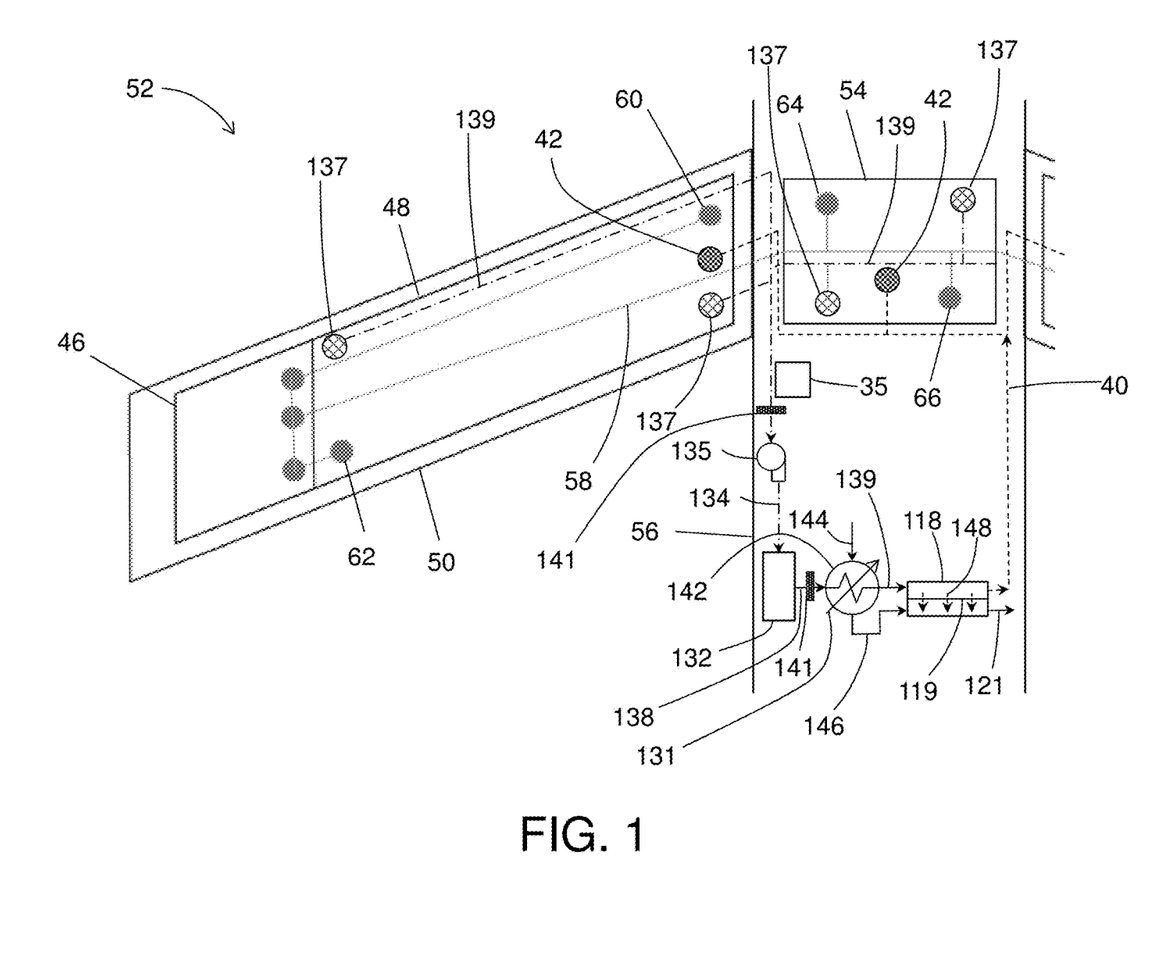
FIG. 1 is a schematic depiction of an example embodiment of a dried inert gas system.

Referring now to the Figures, in which the same numbering is used in more than one Figure to represent the same feature without the necessity of explicit repetition in the description for each Figure, FIG. 1 is a schematic depiction of an onboard inert aircraft gas system. As shown in FIG. 1, a left wing vent box 46 is disposed along with wing fuel tank 48 in a wing 50 of an aircraft 52. The aircraft 52, depicted in a partial view in FIG. 1, also includes a center tank 54 disposed in fuselage 56, and also a right wing and tank and vent box (not shown), with the fuel tanks sharing a common vent system 58 that includes left wing climb vent 60, a left wing dive vent 62, center tank climb vent 64, center tank dive vent 66, and other unnumbered vents depicted by the same circular shapes as the numbered vents.

A reactor 132 receives a fluid flow 134 (assisted by ullage blower 135) from ullage gas collection vents 137 and ullage gas collection conduits 139. In the example embodiment of FIG. 1, the ullage gas contains air components (oxygen and nitrogen) and fuel vapor and serves as both the source of gas comprising oxygen and the source of hydrocarbon. However, other sources of gas comprising oxygen can be utilized (e.g., outside air), and other sources of hydrocarbon can be used (e.g., liquid fuel). The gas comprising oxygen should also comprise at least one other component (e.g., nitrogen from air) to form part of the oxygen-depleted gas after the reaction. The reactor can be any type of reactor capable of reacting oxygen with hydrocarbon fuel such as in a combustion reaction. Combustion can be carried out with or without a catalyst. Examples of catalytic reactors and associated equipment are disclosed, for example, in published patent application US 2011/0262309A1, the disclosure of which is incorporated herein by reference in its entirety. The reaction produces an oxygen-depleted stream 138 comprising water and $CO_2$ as well as residual hydrocarbon, and residual air components (e.g., nitrogen and a reduced amount of oxygen). Combustion can be contained to the reactor 132 with the assistance of flame arrestors 141.

The oxygen-depleted stream 138 is fed first to a heat rejection side of heat exchanger condenser 142 where it is cooled to condense water vapor in the oxygen-depleted stream 138, producing an oxygen-depleted stream with reduced water content 139. Heat exchanger condenser 142 also has a heat absorption side in thermal communication with a heat sink. The heat sink (i.e., cold source) can be any type of heat sink, including but not limited to ambient air (e.g., fan-assisted blown air), ram air, conditioned air from an on-board ECS air cycle machine, a heat transfer fluid in communication with a heat absorption side of a heat exchanger in an on-board ECS air cycle machine, a heat transfer fluid in communication with a heat absorption side of a heat exchanger in an on-board ECS vapor cycle machine, a heat transfer fluid in communication with an evaporator of a vapor compression refrigerant loop, or liquid fuel in an on-board fuel tank. In the example embodiment shown in FIG. 1, aircraft ram air 144 is directed through the heat exchanger condenser 142 as a heat sink.

The heat exchanger condenser 142 is depicted as including an integrated liquid water separator or collector (not shown) for collection of condensate 131. Alternatively, a liquid water separator can be disposed downstream of the heat exchanger condenser 142 to separate and remove liquid water from the oxygen-depleted stream 139. Condensate 131 can be dumped overboard or used in another process (e.g., to provide evaporative cooling in an aircraft ECS).

In some embodiments, the cooling capacity of the heat exchanger condenser 142 may be insufficient to remove enough water from the oxygen-depleted gas to supply to a fuel tank ullage. The combustion reaction with jet fuel produces a relatively large amount of water, yielding roughly 13 molecules of water for every molecule of jet fuel (based on Jet-A surrogate dodecane). A condenser can reduce water vapor content only to the dew point of the oxygen-depleted gas at the condenser's operating temperature. At lower altitudes such as below 10,000 feet or on the ground, the temperature of available ram air can be above the temperatures needed to remove all of the water in the oxygen-depleted gas. For example, during a hot summer day, cooling the exhaust from the catalyst with a condenser operating at ambient temperature of 25° C. will remove much of the water vapor generated from catalytic combustion, but the air stream returned to the ullage could still contain water vapor levels that are too high. For example, in some embodiments, the water vapor level of the oxygen-depleted stream 139 exiting from the heat exchanger condenser 142 contains at least 23 $g/m^3$ of water vapor. In some embodiments, the water vapor level of the oxygen-depleted stream 139 exiting from the heat exchanger condenser 142 contains at least 19 g per kg of the oxygen-depleted stream 139 (i.e., the oxygen-depleted stream 139 comprises at least 1.9 wt. % water vapor). In some embodiments, the water vapor level of the oxygen-depleted stream 139 exiting from the heat exchanger condenser 142 contains at least 2 g water vapor per kilogram of the oxygen-depleted stream 139 (i.e., the oxygen-depleted stream 139 comprises at least 0.2 wt. % water vapor). In some embodiments, the condenser is cooled with outside air of at least 25° C. during one or more operational states. In some embodiments, the heat exchanger 142 can be sized to maintain a low payload footprint or low demand on ram air such that it does not remove all water even at altitude when ram air is at its coldest. Introduction of water into the fuel tanks can cause a number of issues, including condensation inside the tanks which can lead to problems with bacteria growth, ice crystal formation, and fuel quality degradation. Water issues particularly affect while descending from cruise when humid air rushes in and can condense in cold fuel tanks.

The oxygen-depleted stream 139 exiting from the heat rejection side of heat exchanger condenser 142 has a reduced water content, but as discussed above all water has not necessarily been removed. As shown in FIG. 1, the oxygen-depleted stream 139 is fed to a first side of a gas separator 118 comprising a water-permeable membrane 119. The first fluid flow path continues along a first side of the membrane 119 to an inert gas vent line 40 that is in communication with one or more components that utilizes inert gas such as the fuel tank ullage for fuel tank 48 or other fuel tanks, or other inert gas-utilizing components such as a fire suppression system.

The membrane 119, in different modes of operation, selectively transports water vapor. Various materials and configurations can be utilized for the gas separation membrane. Gas separation membranes can rely on one or more physical phenomena for selectivity in transportation of gases across the membrane. In some embodiments, a selective membrane can rely on size-selective pathways through the membrane that selectively allows transport of smaller molecules over larger molecules. Examples of such membranes include membranes that selectively allow faster transport of smaller water molecules compared to larger nitrogen and oxygen molecules in air. Such membranes typically rely on molecule size-selective tortuous paths through a non-porous polymer matrix in the form of a thin film deposited onto a microporous layer. In addition to molecular size, the condensability of a molecule is another parameter that can be used in membrane-based gas separations: the more condensable molecule is selectively permeated over the less condensable molecule(s) due to its higher solubility in the polymer matrix, which in turn leads to a larger driving force for permeation.

Since water molecules are both much smaller and more condensable than oxygen and nitrogen, the selective permeation of water can be accomplished with essentially any polymer-based membrane. Examples of selective materials for water include polyimides known for use in dehydration applications or 2,2-bistrifluoromethyl-4,5-difluoro-1,3-dioxole/tetrafluoroethylene, silicone rubbers (polydimethyl siloxane, polyoctylmethyl siloxane), polysulfones, polyethers (e.g., a copolymer of poly(ethylene oxide) (PEO) and poly(butylene therephthalate) (PBT), polycarbonates, poly(4-methyl-2-pentyne), poly-trimethyl-silyl-propyne (PTMSP), etc. The gas selective membrane can include any of the above materials, alone or in combination with each other or other selective materials. Combinations of different materials can be integrated into a single membrane structure (e.g., in layers, or zones in the x-y plane of a membrane structure), or can be disposed in series or in parallel as separate membrane structures or modules. However, while any of the aforementioned polymers can selectively permeate water vapor over oxygen and nitrogen, maximizing the membrane's selectivity towards water will minimize the loss of feed air through the membrane during operation when vacuum is the driving force; hence, proper identification of a membrane layer is an important consideration in the case of the membrane dryer connected to a vacuum pump. Examples of polymer membranes in this case that can be used with a vacuum pump (or without a vacuum pump) include polyimides, polycarbonates and polysulfones.

With reference again to FIG. 1, water 148 can be selectively transported across the membrane 119 to a second fluid flow path disposed on a second side of the membrane 119 with a discharge 121 of a fluid comprising water. In the example embodiment depicted in FIG. 1, fluid (e.g., permeate gas) flow along the second fluid flow path is provided by heated ram air 146 exhausted from the heat absorption side of the heat exchanger condenser 142. In some embodiments, the heating of the ram air by the heat exchanger condenser 142 can reduce the relative humidity of the ram air to promote absorption of moisture by the ram air as a sweep gas for the gas separator 118. Dried inert air exiting from the gas separator 118 is directed through inert gas vent lines 40 to fuel tank inert gas vents 42. The inert gas flow can be aided by a blower (not shown). In some embodiments, the embodiment depicted in FIG. 1 can accomplish the dual purpose of cooling and drying the combusted inert gas stream, resulting in a much dryer stream entering the fuel tank. Even if outside air is saturated with water vapor, heating it by cooling the inert gas stream raises the temperature such that the air can absorb more water vapor as a sweep gas in the gas separator 118. Compared to an inert gas system utilizing only a condenser, the additional weight of the membrane can in some embodiments be offset by a smaller size of the ram air heat exchanger because of reduced need for temperature reduction of the catalyst exhaust stream since moisture not condensed in the condenser 142 can be removed by the gas separator 118.

In some embodiments, the heated ram air 146 is maintained at or below 180° F. (80° C.) to accommodate fuel tank specifications. Such an upper limit for the temperature of the inert gas entering an aircraft fuel tank is well within the limits of certain dehydration membranes such as polyimides or polysulfones. The membrane acts as a heat exchanger, so the outside air should not heat up the inert gas beyond this threshold. In some embodiments, the heated ram air 146 is maintained at or below a temperature of 80° C. because inert gas temperatures higher than this may cause evaporation of some lighter fuel fractions leading to an increased load on the reactor 132 and the rest of the inert gas system.

Figure 2:
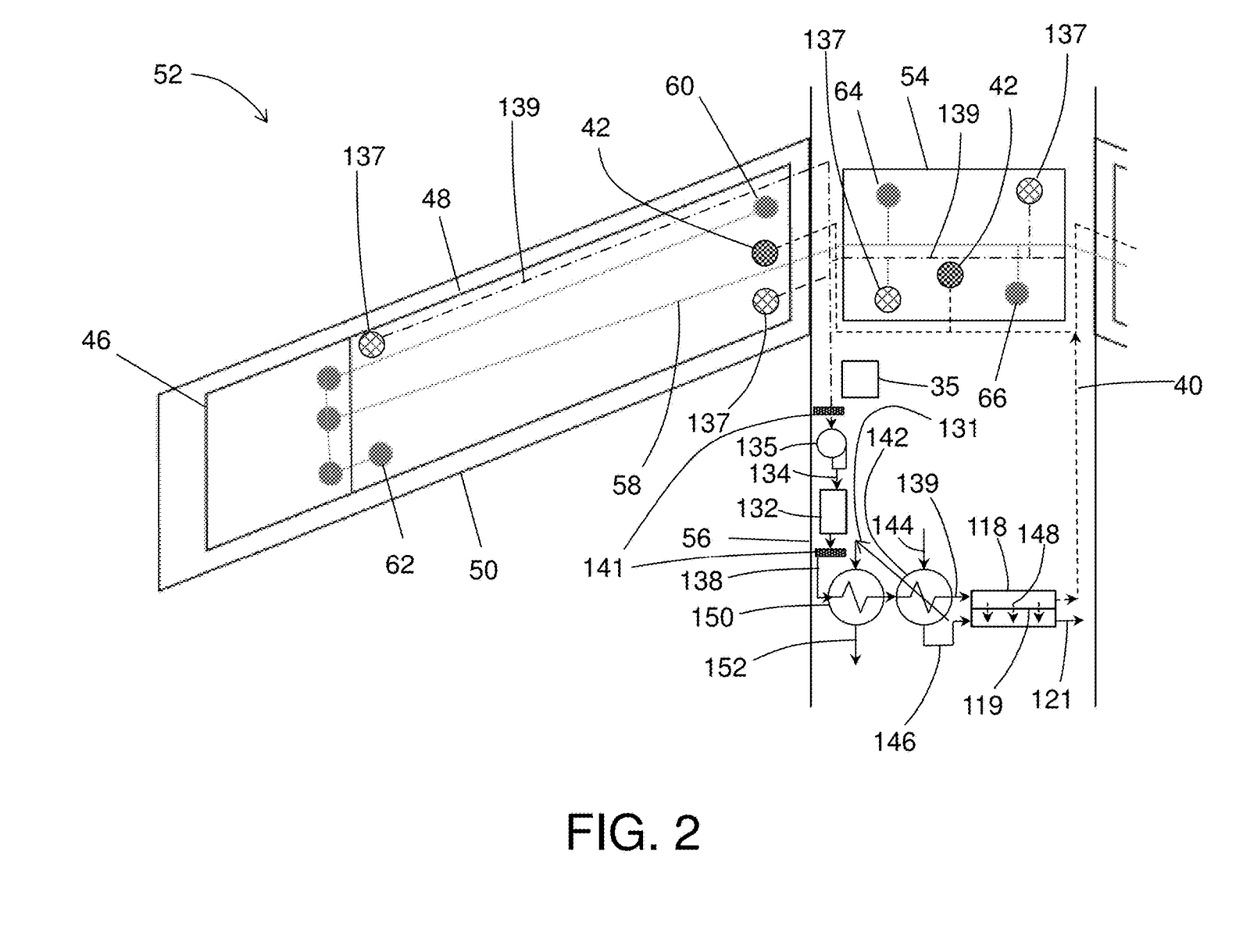
FIG. 2 is a schematic depiction of an example embodiment of a dried inert gas system.

As mentioned above, FIG. 1 is illustrative of a particular example embodiment, and other example embodiments are also contemplated. For example, in the example embodiment of FIG. 1, the condensate 131 is shown as exiting the system, e.g., discharged overboard. FIG. 2 is a schematic depiction where the condensate 131 is utilized in the inert gas system. As shown in FIG. 2, condensate 131 is utilized on a heat absorption side of a second heat exchanger 150 having a heat rejection side disposed on the first flow path between the reactor 132 and the first heat exchanger 142. Typically, the heat of reaction from the reactor 132 is sufficient to boil or otherwise vaporize condensate 131, thereby absorbing heat from oxygen-depleted gas 138. In some embodiments, this can reduce the heat load on or increase the effectiveness of the first heat exchanger condenser. Since the collection of ram air places an aerodynamic drag on the aircraft resulting in increased fuel consumption, reduced heat load on the heat exchanger condenser 142 can allow for reduced ram air consumption and its accompanying fuel penalty. No condensate collection from the second heat exchanger 150 is shown in FIG. 2 based on an example embodiment where the second heat exchanger 150 does not reduce the temperature of the oxygen-depleted gas below its dew point. In other embodiments, any condensate from the oxygen-depleted gas 138 could be separated and collected with a liquid separator integrated into the second heat exchanger 150 or a separate liquid separator downstream from the second heat exchanger.

Figure 3:
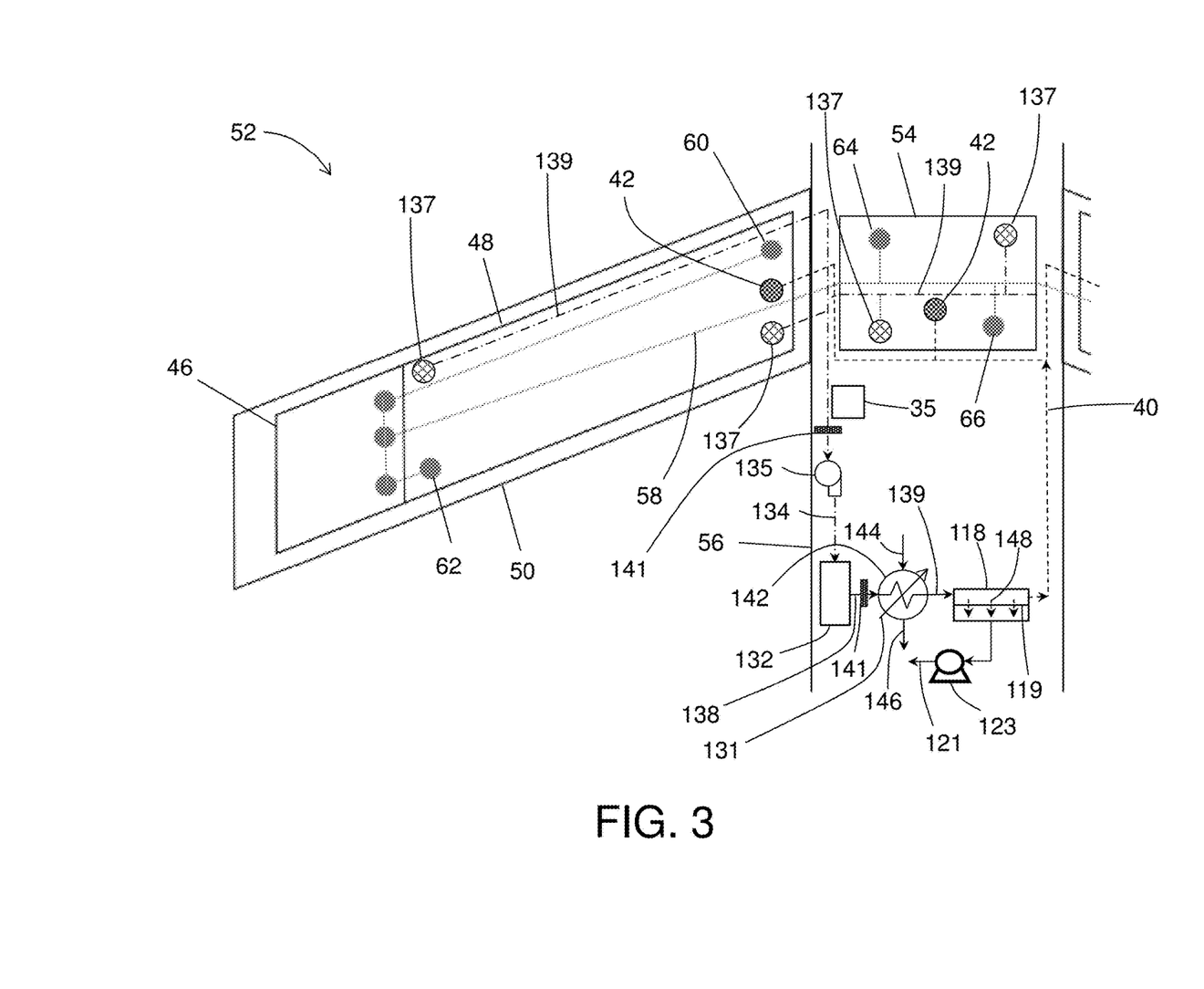
FIG. 3 is a schematic depiction of an example embodiment of a dried inert gas system.
Figure 4:
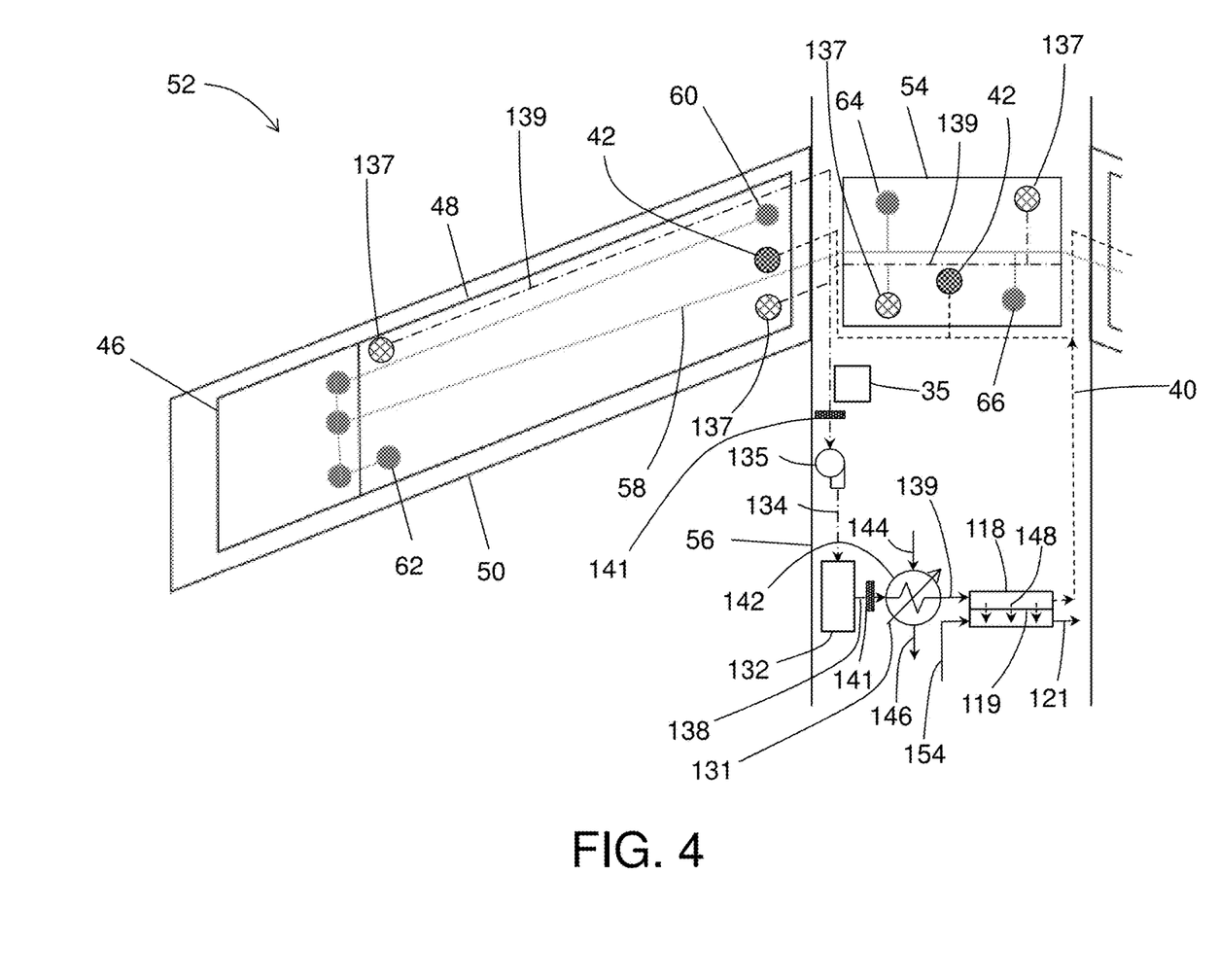
FIG. 4 is a schematic depiction of an example embodiment of a dried inert gas system.

With reference now to FIGS. 3 and 4, these figures show additional alternative configurations. In FIG. 3, instead of using ram air as a sweep gas, the water vapor permeating the membrane 119 is collected by a vacuum pump. For this arrangement, insulation or heating tape can be used along the conduits for the fluid discharge 121 to prevent the permeated water vapor from condensing and freezing before reaching the vent when the system operates at altitudes where the outside temperature is below freezing. FIG. 4 depicts an example embodiment where compressed bleed air 154 from an aircraft engine is used as sweep gas for second side of the gas separator 118. In each of FIGS. 3 and 4, ram air 144 is dedicated for cooling of the catalyst exhaust stream, and heated ram air 146 can be used in another on-board process or discharged overboard.

In some embodiments, a controller 35 can be in operative communication with the above-referenced components and any associated valves, pumps, compressors, conduits, or other fluid flow components, and with switches, inverters, regulators, sensors, and other electrical system components, and any other system components to selectively operate the inert gas system. These control connections can be through wired electrical signal connections (not shown) or through wireless connections. In some embodiments, the controller 35 can be configured to operate the system according to specified parameters, as discussed in greater detail further below.

During operation, the system can be controlled to set fluid flow rates to produce varying amounts of ODA in response to system parameters. Such system parameters can include, but are not limited to the humidity of the ODA, temperature of the fuel in the vehicle fuel tank(s), oxygen content of the fuel in the fuel tanks, oxygen content of vapor in the ullage of fuel tanks, temperature rise in an enclosed space such as a cargo hold or avionics bay, smoke and/or flame detection in said enclosed spaces, and temperature and/or pressure of vapor in the ullage of fuel tanks, and other on-board parameters such as temperature, oxygen content, and/or humidity level of ullage air. Accordingly, in some embodiments, the inert gas management system and components thereof such as shown in FIGS. 1-4 can include sensors for measuring any of the above-mentioned fluid flow rates, temperatures, oxygen levels, humidity levels, as well as controllable output fans or blowers, or controllable fluid flow control valves or gates. These sensors and controllable devices can be operatively connected to the controller 35, which can be an independent controller dedicated to controlling the inert gas management system, or can interact with other onboard system controllers or with a master controller. In some embodiments, data provided by the controller of the inert gas management system can come directly from a master controller.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:
1. An on-board aircraft inert gas system, comprising:
a source of hydrocarbon;
a source of a gas comprising oxygen;
a first fluid flow path between the source of gas comprising oxygen and an inert gas output;
a reactor disposed along the first fluid flow path comprising an inlet that receives hydrocarbon and the gas comprising oxygen and reacts the hydrocarbon with the oxygen to produce an oxygen-depleted gas comprising water vapor, and an outlet that outputs the oxygen-depleted gas comprising water vapor;
a first heat exchanger comprising a water-condensing heat rejection side disposed along the first fluid flow path comprising an inlet that receives the oxygen-depleted gas from the reactor and an outlet that outputs oxygen-depleted gas with a reduced water content, and a heat absorption side in thermal communication with a heat sink including an inlet in communication with a source of aircraft ram air;
a liquid separator that separates water condensate produced by the heat rejection side of the first heat exchanger from the oxygen-depleted gas with reduced water content; and
a gas separator comprising a membrane permeable to water, comprising a first side of the membrane disposed along the first fluid flow path, the separator comprising an inlet on the first side of the membrane that receives the oxygen-depleted gas with reduced water content from the first heat exchanger and an outlet on the first side of the membrane that outputs dried oxygen-depleted gas, and a second side that receives water through the membrane from the oxygen-depleted gas with reduced water content, the separator comprising an outlet on the second side of the membrane that outputs a fluid comprising water.

2. The system of claim 1, wherein the reactor comprises a catalyst that promotes reaction of oxygen with hydrocarbon to produce the oxygen-depleted gas comprising water vapor.

3. The system of claim 1, further comprising a second heat exchanger comprising a heat rejection side disposed on the first fluid flow path between the reactor and the first heat exchanger, and a heat absorption side in communication with water from the liquid separator.

4. The system of claim 3, wherein the heat absorption side of the second heat exchanger comprises an inlet that receives liquid water from the liquid separator and an outlet that outputs water vapor.

5. The system of claim 1, wherein the second side of the gas separator comprises an inlet that receives a gas having a lower partial water vapor pressure than the oxygen-depleted gas with reduced water content.

6. The system of claim 5, wherein the gas separator second side inlet is in communication with a source of aircraft ram air.

7. The system of claim 6, wherein the heat absorption side of the first heat exchanger includes an outlet in communication with the gas separator second side inlet.

8. The system of claim 5, wherein the gas separator second side inlet is in communication with a source of aircraft engine compressed bleed air.

9. The system of claim 1, further comprising a vacuum pump in communication with the gas separator second side outlet.

10. The system of claim 1, wherein the membrane comprises a polymer matrix that provides greater solubility to water molecules than nitrogen or oxygen molecules.

11. The system of claim 1, wherein the source of gas comprising oxygen comprises a fuel tank gas space, and the source of hydrocarbon comprises the fuel tank gas space.

12. An on-board aircraft inert gas system, comprising
a source of hydrocarbon;
a source of a gas comprising oxygen;
a first fluid flow path between the source of gas comprising oxygen and an inert gas output;
a reactor disposed along the first fluid flow path comprising an inlet that receives hydrocarbon and the gas comprising oxygen and reacts the hydrocarbon with the oxygen to produce an oxygen-depleted gas comprising water vapor, and an outlet that outputs the oxygen-depleted gas comprising water vapor;
a first heat exchanger comprising a water-condensing heat rejection side disposed along the first fluid flow path comprising an inlet that receives the oxygen-depleted gas from the reactor and an outlet that outputs oxygen-depleted gas with a reduced water content, and a heat absorption side in thermal communication with a heat sink;

a liquid separator that separates water condensate produced by the heat rejection side of the first heat exchanger from the oxygen-depleted gas with reduced water content, and a gas separator comprising a membrane permeable to water which comprises molecule size-selective tortuous paths that selectively allow faster transport of water molecules compared to nitrogen or oxygen molecules, with a first side of the membrane disposed along the first fluid flow path, the separator comprising an inlet on the first side of the membrane that receives the oxygen-depleted gas with reduced water content from the first heat exchanger and an outlet on the first side of the membrane that outputs dried oxygen-depleted gas, and a second side that receives water through the membrane from the oxygen-depleted gas with reduced water content, the separator comprising an outlet on the second side of the membrane that outputs a fluid comprising water.

13. The system of claim 12, wherein the reactor comprises a catalyst that promotes reaction of oxygen with hydrocarbon to produce the oxygen-depleted gas comprising water vapor.

14. The system of claim 12, further comprising a second heat exchanger comprising a heat rejection side disposed on the first fluid flow path between the reactor and the first heat exchanger, and a heat absorption side in communication with water from the liquid separator.

15. A method of making an inert gas, comprising:
reacting hydrocarbon and oxygen in a gas comprising oxygen to produce an oxygen-depleted gas comprising water vapor;
removing heat from the oxygen-depleted gas comprising water vapor to condense water vapor in a first heat exchanger cooled by a cooling air source including aircraft ram air, and removing condensate to produce an oxygen-depleted gas having reduced water content; and
contacting the oxygen-depleted gas having reduced water content with a membrane permeable to water to produce the inert gas comprising dried oxygen-depleted gas.

16. The method of claim 15, further comprising removing water from the oxygen-depleted gas through the membrane.

17. The method of claim 15, wherein reaction of hydrocarbon with oxygen in the fuel tank vapor is conducted with a catalyst that promotes reaction of oxygen with hydrocarbon to produce the oxygen-depleted gas comprising water vapor.

18. The method of claim 15, wherein the oxygen-depleted gas having reduced water content has a water content of at least 2 g per kg of the oxygen-depleted gas.

19. The method of claim 15, comprising contacting the oxygen-depleted gas having reduced water content with a first side of the membrane permeable to water, and contacting a second side of the membrane a gas having a lower partial water vapor pressure than the oxygen-depleted gas with reduced water content.

20. The method of claim 19, wherein ram air exiting the heat exchanger is the gas directed to the second side of the membrane.

* * * * *